United States Patent [19]

Somers

[11] 4,219,118
[45] Aug. 26, 1980

[54] PROTECTIVE CASE FOR TAPE RECORDING CASSETTES

[75] Inventor: Giles N. Somers, Genéva, Switzerland

[73] Assignee: Claire Corporation AG, Zug, Switzerland

[21] Appl. No.: 906,414

[22] Filed: May 16, 1978

[30] Foreign Application Priority Data

May 16, 1977 [CH] Switzerland .......................... 6071/77

[51] Int. Cl.² ............................................ B65D 85/54
[52] U.S. Cl. ..................................................... 206/387
[58] Field of Search ............. D87/1 D; 206/387, 391, 206/393-394; 211/41; 312/12, 13

[56] References Cited

U.S. PATENT DOCUMENTS

| | | | |
|---|---|---|---|
| 3,281,033 | 10/1966 | Stutzman et al. | 206/394 X |
| 3,763,994 | 10/1973 | Somers | 206/387 |
| 3,909,088 | 9/1975 | Dennehey et al. | 206/387 X |
| 4,055,372 | 10/1977 | Tozawa et al. | 206/387 X |

FOREIGN PATENT DOCUMENTS 2507620 9/1976 Fed. Rep. of Germany ........... 206/387
476462 12/1937 United Kingdom ....................... 312/13

*Primary Examiner*—Stephen Marcus
*Attorney, Agent, or Firm*—Young & Thompson

[57] ABSTRACT

A protective case for magnetic tape or film cassettes comprising, on the one hand, a parallelepiped-shaped box dimensioned to hold at least two cassettes, the box having two main parallel faces joined by perpendicular faces and being open at least on one of its faces perpendicular to the main faces and, on the other hand, a carrier hinged to the box so that it can swing between a position where this carrier is engaged in the box and closes at least one of its open faces and a position where this carrier is opened out from the box. The carrier has at least one wall parallel to the main faces of the box, said wall having on each side at least one protrusion to fit into the hub of a cassette. The holding protrusions are preferably placed symmetrically apart on both sides of each wall of the carrier.

2 Claims, 4 Drawing Figures

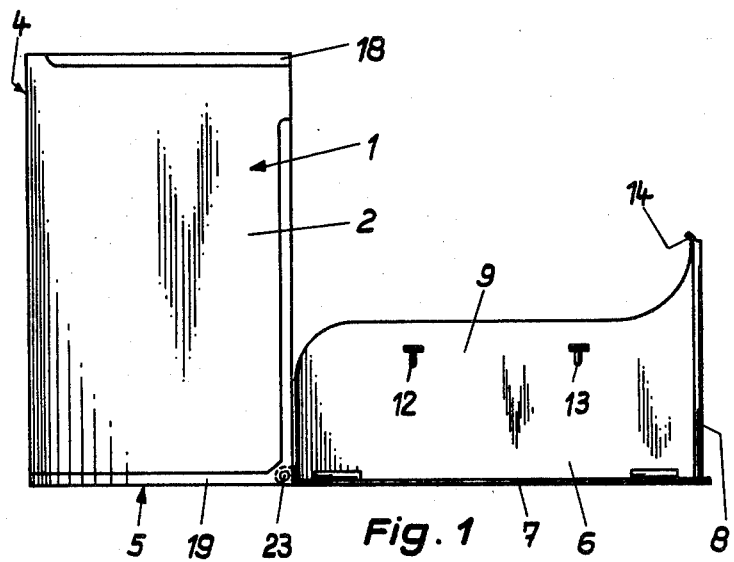
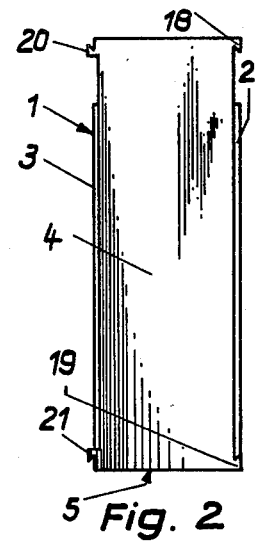
Fig. 1  Fig. 2
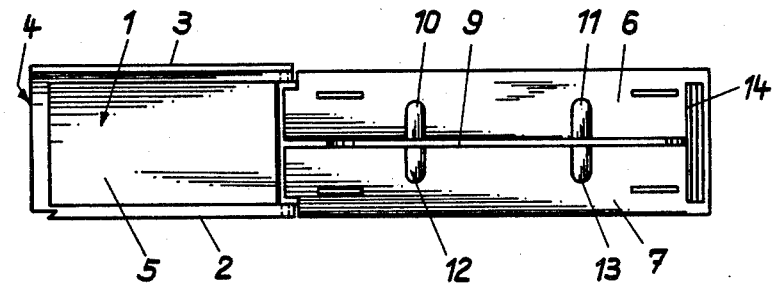
Fig. 3
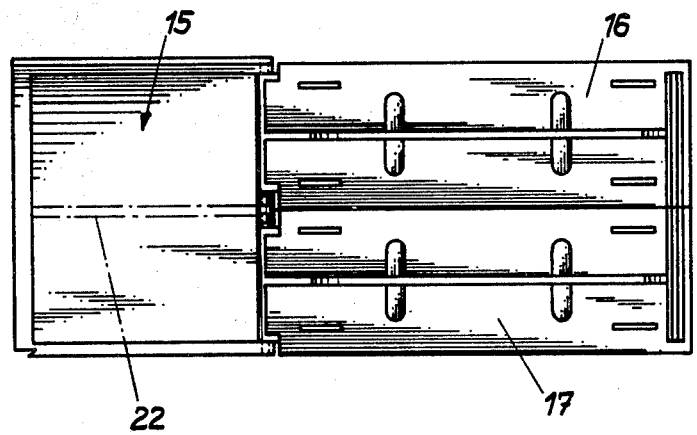
Fig. 4

PROTECTIVE CASE FOR TAPE RECORDING CASSETTES

U.S. Pat. No. 3,763,994 describes a protective case for a magnetic tape cassette which is a parallelepiped-shaped box dimensioned to hold one cassette. The present invention aims at providing an improved case of this type. The object of this invention is the provision of a case for magnetic tape cassettes comprising, on the one hand, a box of a general parallelepiped shape sized to hold at least two cassettes, the box having two main parallel faces joined by perpendicular faces and being open on at least one of its perpendicular faces to the main faces and on the other hand, a cassette carrier hinged to the box so that it can swing between a position where this carrier is engaged in the box and closes at least one of its open faces, and a position where this carrier is disengaged from the box. According to the invention the case is characterised in that the carrier has at least one wall parallel to the main faces of the box; this wall has, on each of its sides, at least one protrusion to fit into the hub of a cassette.

The drawing annexed shows schematically and as examples two forms of execution of the protective case according to the invention.

FIG. 1 is a side view of the first form of execution showing the carrier in the open position at 90°.

FIG. 2 is a rear view of the left hand of FIG. 1.

FIG. 3 is a top plan view corresponding to FIG. 1.

FIG. 4 is a similar view to FIG. 3 and relative to the second form of execution.

The protective case according to FIGS. 1 to 3 comprises, on the one hand, a box 1 of a general parallelepiped shape sized to hold two twin hub tape cassettes, for example cassettes designed to enclose magnetic tapes for sound recording and reproduction. The box comprises two main parallel faces 2, 3, joined by perpendicular faces 4, 5. The faces opposite faces 4 and 5 are open. The case also comprises a carrier 6 hinged at 23 to the box so that it can swing between a position where this carrier is engaged in the box and a position where this carrier is sufficiently disengaged from the box to allow cassettes to be placed onto or removed from the carrier. FIG. 1 represents this latter position. When the carrier is engaged in the box, its part 7 closes exactly the open face of the box opposite face 4, while another part 8 of the carrier closes exactly the open face of the box opposite face 5.

The carrier 6 has a wall 9 parallel to the faces 2 and 3 of the box. On each side of the wall 9 there is a pair of protrusions 10, 11, and 12, 13. These two pairs of protrusions are placed symmetrically apart with respect to the centre line of the wall 9 and each pair is designed to fit into the hubs of a cassette. Thus, two cassettes can be held in the carrier 6, one on each side of the wall 9.

At the extremity of the part 8 of the carrier 6, the catch 14 has been designed to work in conjunction and elastically with corresponding means on the box, not shown in FIG. 1, when the carrier is closed in the box, in order to prevent its opening accidentally.

In the second form of execution, shown in FIG. 4, the case comprises a box 15 on which two carriers 16 and 17 are hinged, each of them being identical to the carrier 6 of the first form of execution. These two carriers are hinged independently to the box 15, on the same geometric axis. One or the other of the carriers 16, 17 can be disengaged selectively from the box 15. Of course, the box 15 is wide enough to receive the two carriers, as shown in FIG. 4.

As an alternative, there can be more than two carriers hinged onto the same box of a suitable width.

On the other sides of the box 1 or of box 15, means are provided to allow the lateral sliding together of several cases, one against the other, as is already known. On the drawing, the salient runners 18, 19 on one of the sides of the box 1 can be seen and also their complementary formed runners on the opposite side. It is understood that the parts 18 and 19 of a case slide into the corresponding dovetail parts 20 and 21 of the next case. Similar dovetail means can be provided for in alternative systems for joining the cases the one to the other not laterally but by superposition.

As a variation in the form of execution of FIG. 4, the box could include a partition wall 22 so that there would be two housings in this box to receive respectively the carrier 16 and the carrier 17. However, the absence of the wall 22 is an advantage from the point of view of the manufacturing price of the case.

Although the examples given describe protective cases for twin hub cassettes, in other forms of execution there could be protective cases for single hub cassettes, such as those used in super-8 cinematographic films, for example.

The examples described present the following advantages with regard to the existing cases.

Reduction of the quantity of plastic material necessary for storage of a given number of cassettes; more rapid manufacture for a given cassette storage capacity; less weight than for equivalent cassette storage capacity; easier selection of cassettes (for example in an automobile) since each carrier is wider than the carriers of the existing cases; easier choice for the user who, by opening only one carrier, has simultaneously accessible two cassettes instead of one. When standing in the upright position the case being wider has a better stability. Simpler and faster assembling of cases also results, since the number of cases is diminished for an equivalent cassette storage capacity.

The fact that the new construction presents all these advantages, and that, in spite of it, this advantageous construction has not been proposed earlier, shows that the idea to put two cassettes back to back on a same wall of a mobile carrier was not evident at all, but in fact ran contrary to a prejudice according to which each cassette had to have its own individual case.

I claim:

1. Protective case for magnetic tape cassettes or film cassettes, comprising a parallelepiped-shaped box having two main parallel faces and a carrier hinged to the box for swinging between a position in which said carrier is engaged in the box and closes the box, and a position in which said carrier is opened out of the box, said carrier comprising a central wall parallel to its plane of oscillation and parallel to and equally spaced between said two main parallel faces, and, on each of the two opposite faces of said wall, two spaced protrusions to fit into the two hubs of a cassette.

2. Protective case according to claim 1, wherein the carrier presents locking means which work in conjunction and elastically with corresponding means on the box when the carrier is engaged in the box, in order to prevent the case from opening accidentally.

* * * * *